United States Patent [19]
Muto

[11] Patent Number: 5,634,171
[45] Date of Patent: May 27, 1997

[54] IMAGE RECORDING APPARATUS AND IMAGE RECORDING METHOD

[75] Inventor: Hakaru Muto, Yokohama, Japan

[73] Assignee: Canon Kabushiki Kaisha, Tokyo, Japan

[21] Appl. No.: 412,007

[22] Filed: Mar. 28, 1995

[30] Foreign Application Priority Data

Mar. 31, 1994 [JP] Japan .................. 6-063593

[51] Int. Cl.$^6$ ............................................ G03G 15/04
[52] U.S. Cl. ................................................ 399/32; 399/51
[58] Field of Search .................................. 347/115, 116, 347/232, 248, 250; 355/203, 204, 208, 326 R, 327, 271, 272, 273

[56] References Cited

U.S. PATENT DOCUMENTS

| | | | |
|---|---|---|---|
| 5,083,140 | 1/1992 | Peterson et al. | 347/248 |
| 5,235,392 | 8/1993 | Hediger | 355/271 |
| 5,264,870 | 11/1993 | Egawa | 355/248 |
| 5,325,154 | 6/1994 | Tayama et al. | 355/326 R |
| 5,331,341 | 7/1994 | Egawa et al. | 347/232 |
| 5,349,374 | 9/1994 | Arai et al. | 347/232 |
| 5,424,763 | 6/1995 | Komiya et al. | 347/232 X |
| 5,457,487 | 10/1995 | Sasaki et al. | 347/116 |
| 5,519,500 | 5/1996 | Kumamoto | 347/250 X |
| 5,541,637 | 7/1996 | Ohashi et al. | 347/248 |
| 5,565,906 | 10/1996 | Schoon | 347/248 |

FOREIGN PATENT DOCUMENTS

| | | |
|---|---|---|
| 50-50935 | 5/1975 | Japan . |
| 50-93437 | 7/1975 | Japan . |
| 4-212563 | 8/1992 | Japan . |

*Primary Examiner*—Matthew S. Smith
*Attorney, Agent, or Firm*—Fitzpatrick, Cella Harper & Scinto

[57] ABSTRACT

An image recording apparatus includes a rotationally driven image carrier; a position signal output device for outputting a position signal indicating that the image carrier is at a predetermined rotational position; a scanning device for scanning a photosensitive drum with a light beam which is modulated in accordance with the image signal; a beam detection signal generating device for generating a beam detection signal upon detection of the light beam at a predetermined position, so as to regulate the timing of the light beam modulation by the image signal for each line of scan; an image transferring/superposing device for successively transferring and superposing on the image carrier a plurality of color image components which are successively formed on the photosensitive drum based on the image signals which are input in response to the position signals for formation of respective color image components; a measuring device for measuring the time difference between the position signal and the detection signal for each color image component, and a control device for controlling at least the rotation of the image carrier based on the time difference measured by the measuring device.

20 Claims, 15 Drawing Sheets

FIG. 4

| DETECTED VALUE | 0/8 DOT | 1/8 DOT | 2/8 DOT | 3/8 DOT | 4/8 DOT | 5/8 DOT | 6/8 DOT | 7/8 DOT | 8/8 DOT |
|---|---|---|---|---|---|---|---|---|---|
| ΔT (μSec) | 0 ~ 25.8 | 25.8 ~ 77.3 | 77.3 ~ 128.9 | 128.9 ~ 180.5 | 180.5 ~ 232.1 | 232.1 ~ 283.7 | 283.7 ~ 335.2 | 335.2 ~ 386.8 | 386.8 ~ 412.6 |
| PULSE NUMBER | 4800 (-0) | 4799 (-1) | 4798 (-2) | 4797 (+3) | 4796 OR 4804 | 4803 (+3) | 4802 (+2) | 4801 (+1) | 4800 (+0) |

POSITION SIGNAL  
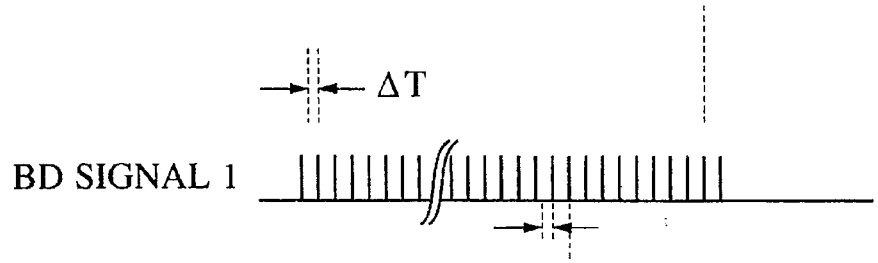
BD SIGNAL 1 FIG. 9(b)
46-/Q  
OUTPUT OF 48  
BD SIGNAL 2

IMAGE RECORDING APPARATUS AND IMAGE RECORDING METHOD

BACKGROUND OF THE INVENTION

1. Field of the Invention

The present invention relates to an image recording apparatus such as a laser printer or a copying apparatus of the type in which an image is formed on an image carrier through charging, image exposure and development. More particularly, the present invention is concerned with an image recording apparatus such as a laser beam printer or a copying apparatus, wherein the step of transferring a recorded image to a transfer paper sheet is repeated a plurality of times so that superposed images of different colors are formed on the recording paper sheet so as to present a full-color image. The invention also relates to an image recording method to be used for such an image recording apparatus.

2. Description of the Related Art

A full-color image recording apparatus has been known which employs repetition of a step for transferring a recorded image to a recording paper sheet held on a transfer drum, the image having been formed on an image carrier through electrostatic charging, image exposure and development, so that superposed images of different colors are formed on the recording paper sheet so as to provide a full color image. This type of image recording apparatus is disclosed in, for example, Japanese Unexamined Patent Publication No. 50-50935.

In operation, a position signal 35 is produced when the transfer drum is at a predetermined rotational phase or position, and this signal is used as a vertical synchronizing signal which gives a cue to the start of each image forming cycle for forming an image of each color. Meanwhile, a BD signal 32 is produced when a deflected laser beam passes a predetermined position. This BD signal 32 is used as a horizontal synchronizing signal.

FIG. 13 illustrates general constructions of a full-color image forming apparatus (denoted by 33) and a controller (denoted by 34) which produces image data.

Referring to this Figure, a position signal 35 indicates the leading end of an image as viewed in the direction of a sub-scan. A BD signal 36 indicates the start position of the image in the direction of a main scan. Numeral 37 denotes an image signal. The controller 34 produces image data of each color image component in synchronization with the position signal 35 in the direction of the sub-scan and in synchronization with the BD signal 36 in the direction of the main scan, thus delivering one-line of image data.

As will be detailed later, image data 37-1, 37-2, 37-3 and 37-4 corresponding to magenta, cyan, yellow and black color components are delivered in accordance with the timing chart shown in FIG. 15, whereby a full-color image is printed by the image forming apparatus 33.

A description will now be given of the method of generating the BD signal 32, as well as of the method of generating the position signal 35 by an interrupter, with specific reference to FIG. 14.

FIG. 14 shows, by way of example, blocks of a circuit which pertains to the BD signal 32 and the position signal 35, while FIG. 15 is a timing chart showing timings of various signals appearing in the circuit shown in FIG. 14.

Position signal 35 is supplied to a D flip-flop 38. The output of the D flip-flop 38 is set high when the BD signal 32 rises, so that an AND gate 39 is opened to pass the BD signal 32.

A counter 40 counts BD signals 36 to determine the timing of an output of one-page of image data of each color image component. When the counter 40 has counted up a predetermined number of BD signals 36, a ripple carry of the counter 40 resets the D flip-flop 38. Timings of signals produced in this circuit are shown in FIG. 15. Numerals 41 and 42 denote inverters.

A relationship between the BD signal 32 and the BD signal 36 will be clearly seen from FIG. 15. Image data 37-1, 37-2, 37-3 and 37-4 of respective color image components are produced at timings as shown in FIG. 15, so that a full color image composed of image components of the four colors is printed. FIG. 16 shows, by way of example, the positional relationship between two color image components out of the four color image components. Thus, FIG. 16 illustrates an example of a sample of a print formed in two colors, specifically cyan and yellow, by an image forming apparatus of the kind described.

It will be seen that the cyan image component 36-1 and the yellow image component 36-3 are mis-registered with or staggered from each other by an amount approximating the pitch of the main scan lines.

This mis-registration is attributed to the following reason. It will be seen from the enlarged view (a) in FIG. 15 that the cyan color component 36-1 is formed at the correct position since the timing of rise of the BD signal 32 has happened to coincide with the timing of fall of the position signal 35, whereas, in the time section shown in the enlarged view (b) in FIG. 15, the timing of rise of the BD signal 32 fails to coincide with the timing of fall of the position signal 35, leaving a time difference ΔT therebetween. This time difference ΔT appears as the mis-registration between the two color image components shown in FIG. 16.

A method is proposed in, for example, Japanese Patent Laid-Open No. 4-212563, for eliminating generation of such a time difference ΔT in an image recording apparatus which operates in an asynchronous manner as described above.

The proposed method calculates the time difference between the BD signal 32 and the position signal 35 which is used as a reference, and, if the time difference is greater than half the signal period of the BD signal 32, the BD signal immediately preceding the calculated BD signal is sent to the controller as the BD signal 36, whereas, if not, the calculated BD signal is sent to the controller. According to this method, the amount of mis-registration cannot exceed ½ the width of the sub-scan, that is, the mis-registration is suppressed.

It has also been proposed to control a high-speed motor 12 in accordance with the calculated time difference.

The first-mentioned proposed method, however, cannot completely eliminate color mis-registration. The second-mentioned proposed method also is disadvantageous in that, once the speed of the high-speed motor is changed, a considerably long time is required to restore the rotation speed, failing to provide highly accurate and delicate control of the image positions.

SUMMARY OF THE INVENTION

Accordingly, an object of the present invention is to provide an image recording apparatus in which any mis-registration between color image components is corrected before the writing of the image components, so as to provide a record image without color mis-registration, thereby overcoming the above-described problems of the known art.

To this end, according to the present invention, there is provided an image recording apparatus in which the timing of rotation of an image carrier and the timing of deflection of a light beam are controlled asynchronously with each other, wherein the rotation of the image carrier is controlled based on a measured difference between the timing of rotation of the image carrier and the timing of deflection of the light beam, so as to minimize mis-registration between color image components of different colors attributable to the difference between the timing of rotation of the image carrier and the timing of the deflection of the light beam.

More specifically, the present invention in one aspect provides an image recording apparatus comprising: a rotationally driven image carrier; position signal output means for outputting a position signal indicating that the image carrier is at a predetermined rotational position; scanning means for scanning a photosensitive drum with a light beam modulated in accordance with the image signal; beam detection signal generating means for generating a beam detection signal upon detection of the light beam at a predetermined position, so as to regulate the timing of the light beam modulation by the image signal for each line of scan; image transferring/superposing means for successively transferring and superposing on the image carrier a plurality of color image components which are successively formed on the photosensitive drum based on the image signals which are input in response to the position signals for formation of respective color image components; measuring means for measuring the time difference between the position signal and the detection signal for each color image component; and control mans for controlling at least the rotation of the image carrier based on the time difference measured by the measuring means.

In a preferred form of the invention, the control means includes a stepping motor for rotationally driving the image carrier, and driving pulse output means for outputting pulses of a number which varies in accordance with the time difference measured by the measuring means.

In a preferred form of the invention, the control means performs the control based on the time difference after receipt of the position signal and before the output of the image signal of the next color image component.

In one form of the present invention, the position signal is a pulse signal having a predetermined duration, and the measuring means measures the time difference between the front edge of the position signal and the detection signal, and the control means performs the control based on the time difference within a time period corresponding to the pulse signal.

In one form of the present invention, the position signal output means detects a member of a predetermined width attached to the image carrier and outputs as the position signal a pulse of a duration corresponding to the width of the member.

In one form of the invention, the image recording apparatus further comprises means for measuring the duration of the position signal before the image signal is output.

In one form of the invention, the formation of color image components is performed by developing means provided for each of the color image components, and moving means for successively bringing the developing means for the successive color image components to a developing zone.

Preferably, the moving means commences the movement of the developing means for the subsequent color image component towards the developing zone before the transfer of a color image component to the image carrier.

In one form of the invention, the control means performs the control based on the time difference after completion of the transfer of the preceding color image component to the image carrier.

The present invention in another aspect provides an image recording apparatus, comprising: a rotationally driven image carrier; position signal output means for outputting a position signal indicating that the image carrier is at a predetermined rotational position; scanning means for scanning a photosensitive drum with a light beam modulated in accordance with the image signal; beam detection signal generating means for generating a beam detection signal upon detection of the light beam at a predetermined position, so as to regulate the timing of the light beam modulation by the image signal for each line of scan; image transferring/ superposing means for successively transferring and superposing on the image carrier a plurality of color image components which are successively formed on the photosensitive drum based on the image signals which are input in response to the position signals for formation of respective color image components; measuring means for measuring the time difference between the position signal and the detection signal for each color image component; and control means for controlling, based on the time difference measured by the measuring means, the position of the light beam in the direction which crosses the direction of the line of scan by the light beam.

The above and other objects, features and advantages of the invention will become clear from the following description of the preferred embodiments taken in conjunction with the accompanying drawings.

BRIEF DESCRIPTION OF THE DRAWINGS

FIG. 4 is an illustration of driving pulse data which is determined in accordance with a time difference detected by a counter incorporated in the circuit shown in FIG. 1 and which is applied to a pulse motor;

FIGS. 9(a)–(e) comprise a timing chart illustrative of the timings of signals employed in the process shown in FIG. 8;

DESCRIPTION OF THE PREFERRED EMBODIMENTS

Preferred embodiments of the present invention will be described with reference to the accompanying drawings.

[First Embodiment]

Figure 13:
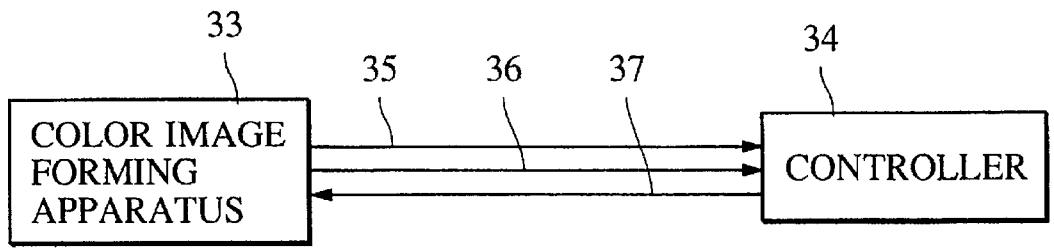
FIG. 13 is a block diagram showing the construction of a conventional control section for controlling the operation of the image recording apparatus shown in FIG. 12.
Figure 14:
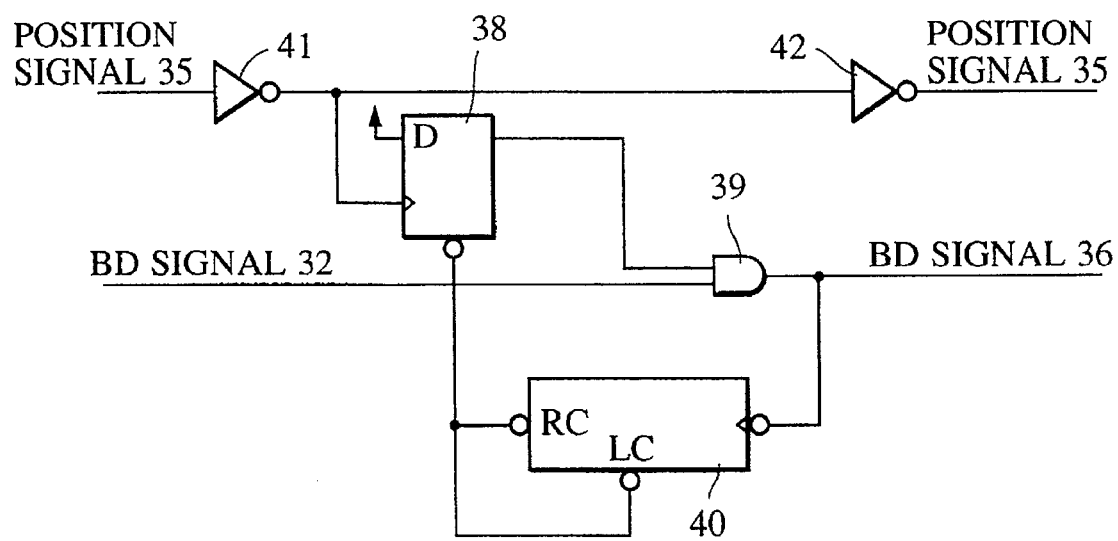
FIG. 14 is a block diagram showing the construction of a circuit pertaining to a BD signal and a position signal shown in FIG. 13.
Figure 16:
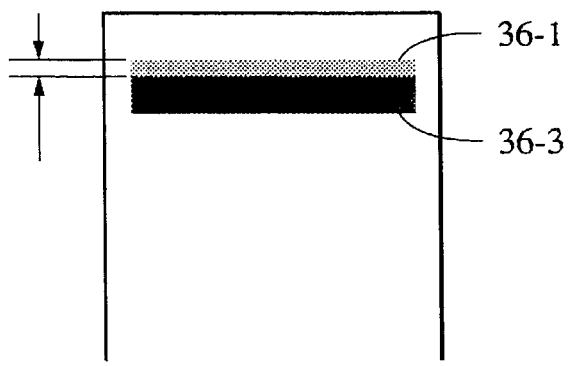
FIG. 16 is an illustration of a sample of 2-color printing performed by the color image forming apparatus under the conventional control as shown in FIG. 13.
Figure 15:
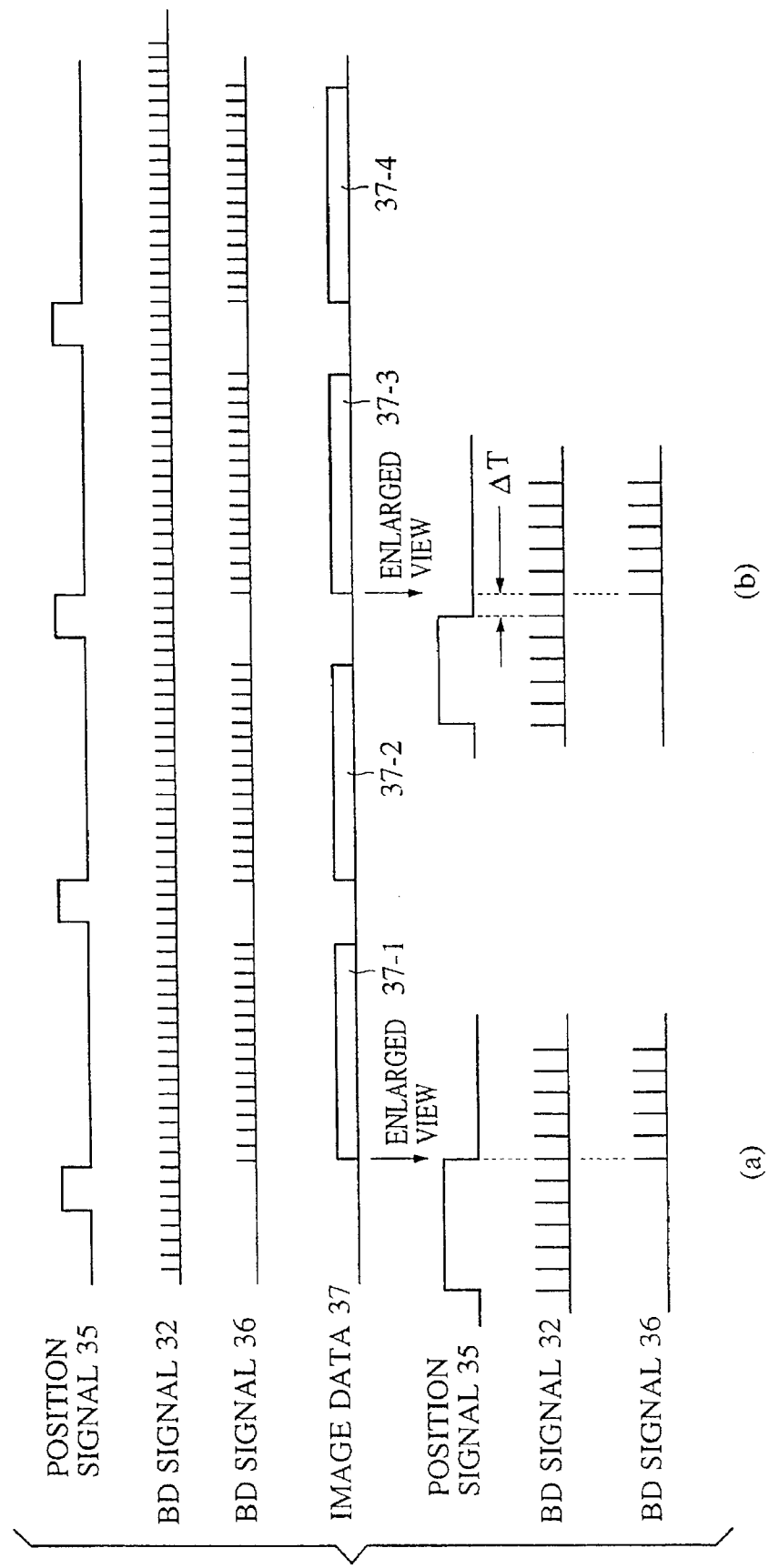
FIG. 15 is a timing chart showing timings of signals in the circuit shown in FIG. 14.
Figure 13:
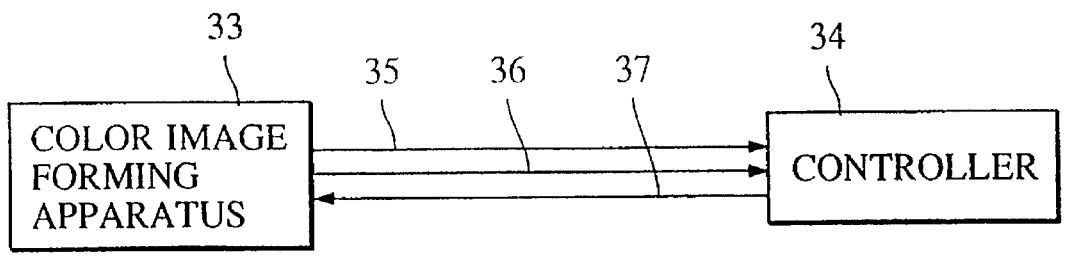
Figure 14:
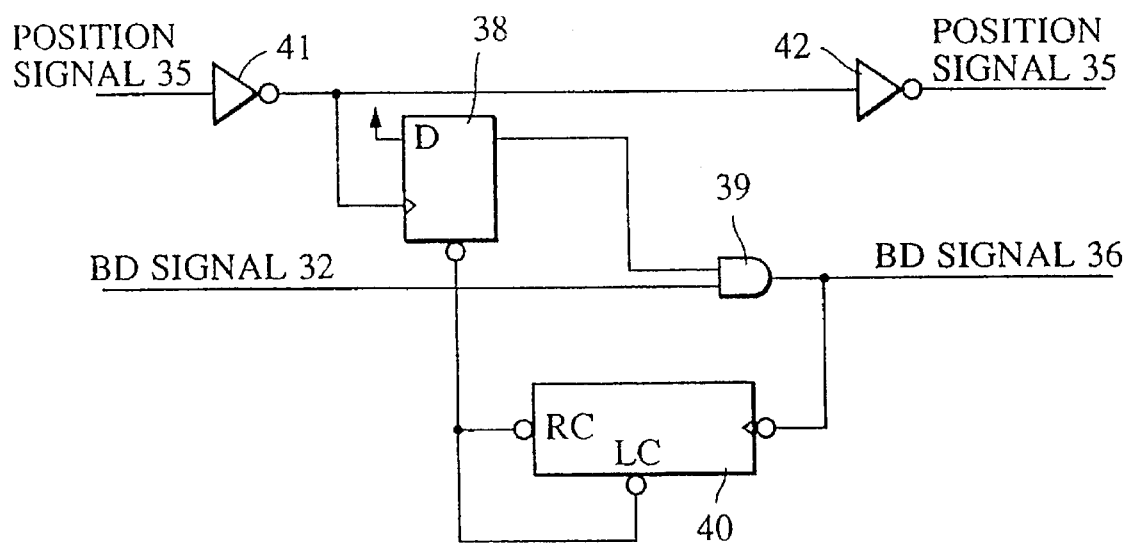
Figure 16:
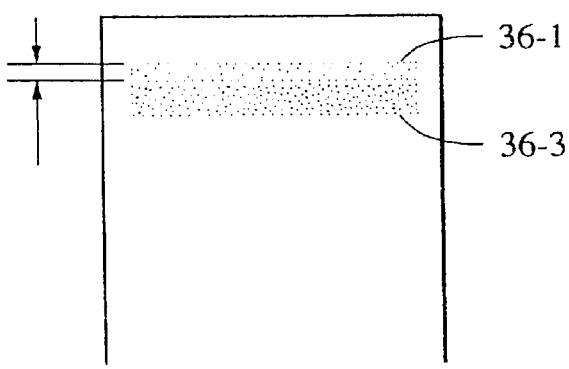

An image forming apparatus as a first embodiment of the present invention has a basic structure which is the same as that described before in connection with FIG. 13. Detailed description of the basic structure, therefore, is omitted. The first embodiment also employs features common to those shown in FIG. 14. Thus, in the following description, features which are equivalent to those shown in FIGS. 13 and 14 are denoted by the same reference numerals as those used in these Figures.

A description will now be given of the detail of the construction of a color image recording apparatus 33 as the first embodiment of the present invention.

Figure 10:
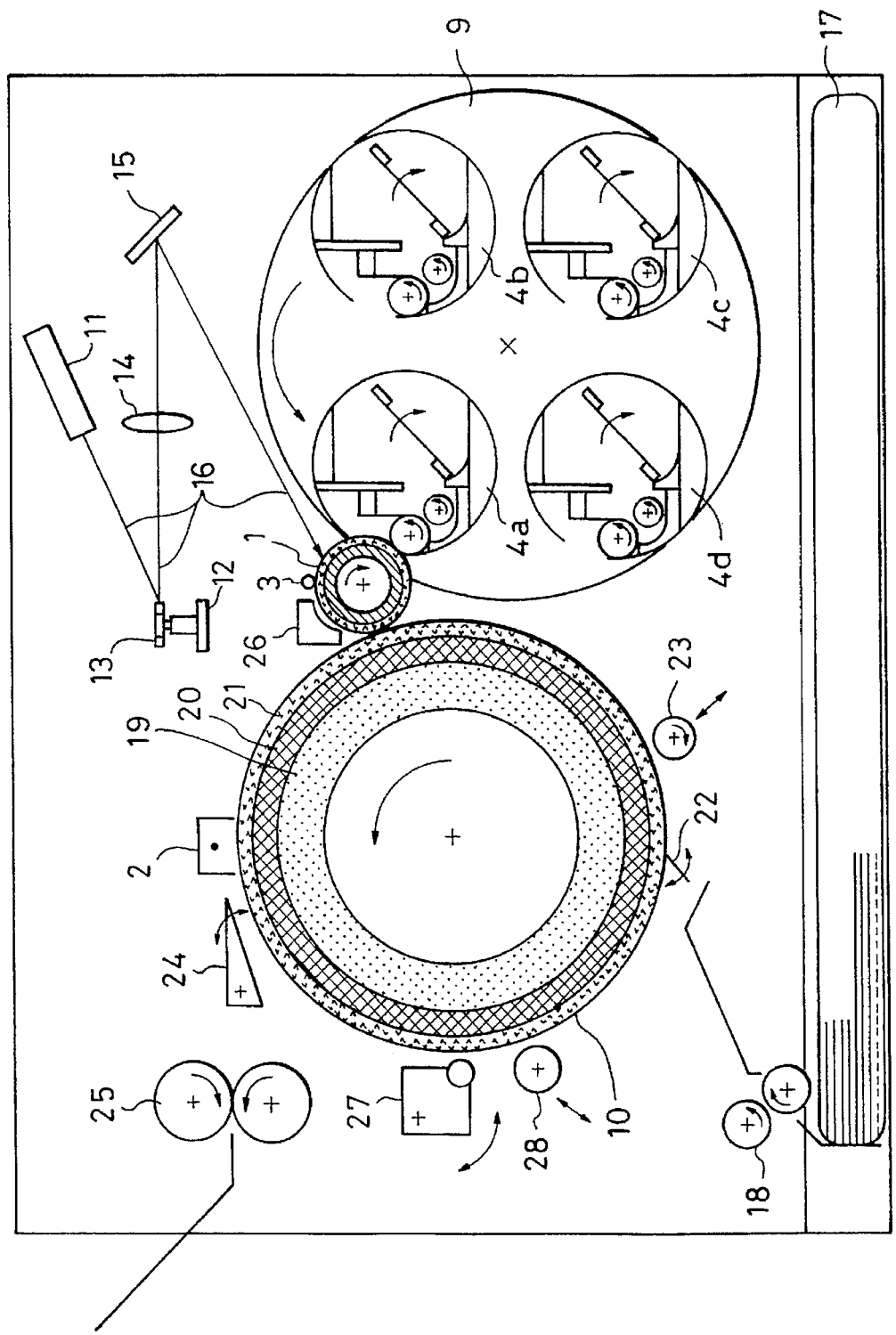
FIG. 10 is a schematic sectional view of a color image recording apparatus as an embodiment of the present invention, illustrative of an image forming process performed by the apparatus.
Figure 10:
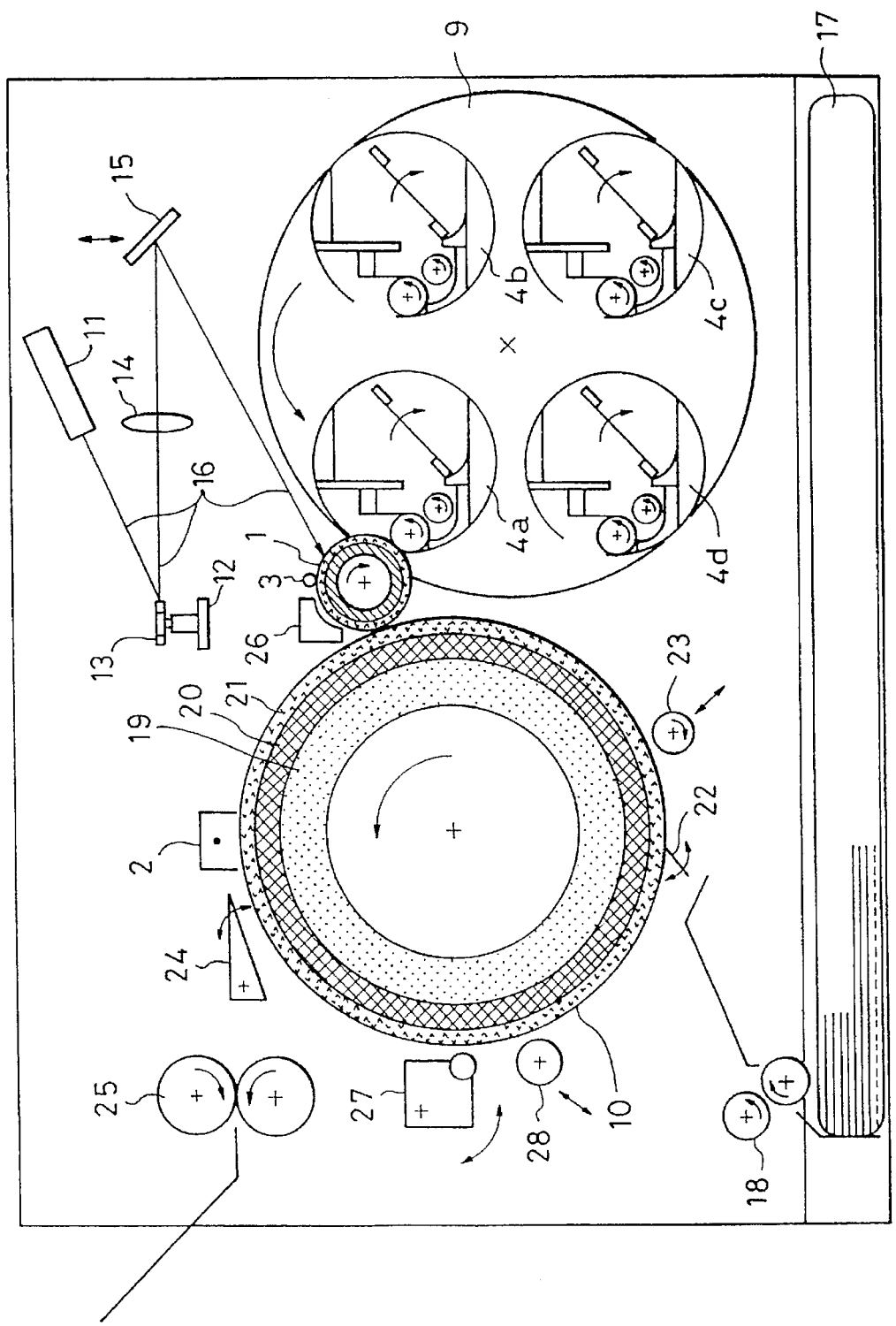

FIG. 10 is a schematic sectional view of the color image recording apparatus 33, illustrative of an image forming process. The color image recording apparatus 33 has a photosensitive drum 1, a roller charger 3, and a developing cartridge assembly which is disposed at the right side of the photosensitive drum 1 as viewed in FIG. 10. The developing cartridge assembly includes four developing cartridges 4a, 4b, 4c and 4d, each having a toner container and a developing device integrated with each other and each being renewable when the toner container has become empty as a result of consumption. These four developing cartridges 4a, 4b, 4c and 4d are carried by a support 9 and have developing windows 5a, 5b, 5c and 5d (see FIG. 11) which are arranged on a circle centered at the axis of rotation of the support 9.

Figure 11:
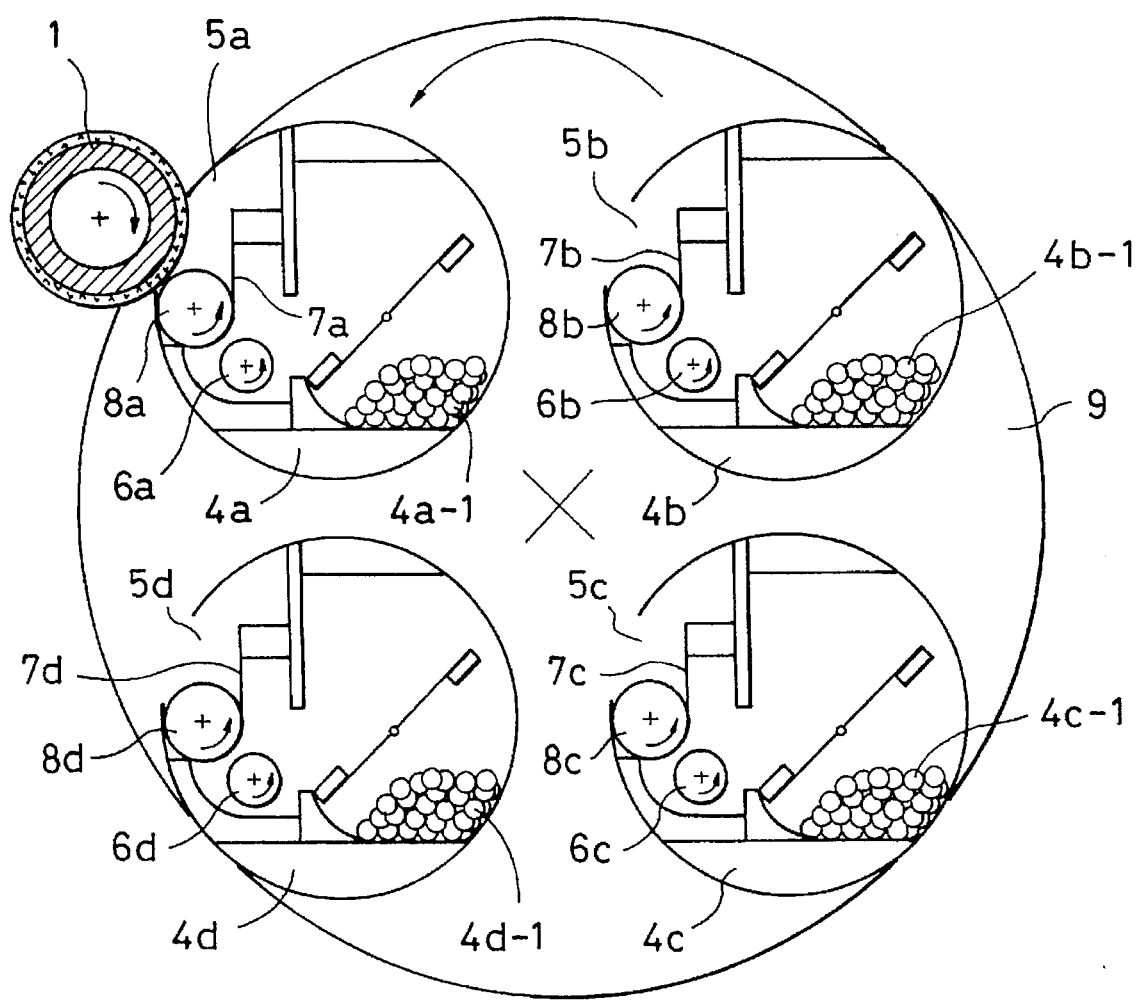
FIG. 11 is an enlarged sectional view of a portion of the apparatus shown in FIG. 10 including a photosensitive drum and parts therearound.

Referring now to FIG. 11, the toner containers of the developing cartridges 4a, 4b, 4c and 4d respectively contain yellow toner 4a-1, magenta toner 4b-1, cyan toner 4c-1 and black toner 4d-1. The developing cartridges 4a, 4b, 4c and 4d also have application rollers 6a, 6b, 6c and 6d and toner doctoring members 7a, 7b, 7c and 7d, as well as developing rollers 8a, 8b, 8c and 8d. The toners are applied to the developing rollers 8a, 8b, 8c and 8d by the application rollers 6a, 6b, 6c and 6d, while the thicknesses of the toner layers are limited by the doctoring members 7a, 7b, 7c and 7d. Preferably, the doctoring member is made of a material which is chargeable in the polarity opposite to the charge of the toner. Thus, when the toner is of the type which is negatively chargeable, the doctoring member is preferably made of, for example, nylon, whereas, when the toner is of the type which is positively chargeable, the doctoring member is made of, for example, a silicone rubber.

It is also preferred that the developing rollers 8a, 8b, 8c and 8d are rotated at a peripheral speed which is about 1.0 to 2.0 times as high the peripheral speed of the photosensitive drum 1.

The developing cartridge assembly including the developing cartridges 4a, 4b, 4c and 4d carried by the support member 9 is driven such that the developing windows 5a, 5b, 5c and 5d face the surface of the photosensitive drum 1 when the respective cartridges are brought to confront the photosensitive drum, by a suitable driving method such as that disclosed in detail in Japanese Patent Laid-Open No. 50-93437. The developing cartridges 4a, 4b, 4c and 4d are intended to eliminate troublesome work such as make-up of toners and protective maintenance and, therefore, are easily renewable by users which do not have any specific skill or knowledge. In order to simplify the construction of the developing cartridge, while reducing the cost and size of the same, it is preferred to use a mono-component toner, although the invention does not exclude the use of bi-component toner.

Referring again to FIG. 10, a transfer drum 10 disposed at the left side of the photosensitive drum 1 is adapted to hold a transfer paper sheet (not shown) to which a toner image formed on the photosensitive drum 1 is to be transferred.

In operation, the photosensitive drum 1 is driven by a suitable driving means (not shown) at a peripheral speed of about 100 mm/sec in a direction indicated by the arrow. In this embodiment, the photosensitive drum 1 has an aluminum cylinder having a diameter of 40 mm and a photoconductive layer which is formed on the outer peripheral surface of the aluminum cylinder by applying an organic photosensitive composition (OPC) thereto. The organic photosensitive member may be A—Si, CDs, Se or the like.

The image recording apparatus further has various components disposed in an upper part thereof, including light-emitting elements (referred to as laser diodes) 11 which constitute an exposure device, a polygon mirror 13 driven at a high speed by a high-speed motor 12, a lens 14 and a reflector mirror 15.

In this embodiment, a composite voltage composed of a D.C. voltage of −700 V and an A.C. voltage of −1500 V in terms of Vp-p (peak-to-peak voltage) at 700 Hz superposed to the D.C. voltage is applied to the roller charger 3, so as to realize a substantially uniform charging to −700 V.

The exposure device constituted by the laser diodes 11 receives signals modulated in accordance with the image information of, for example, magenta color, and emits light which is applied to the surface of the photosensitive drum 1 through an optical path 16. The potential of the portion of the photosensitive drum surface irradiated with this light is elevated to about −100 V, whereby an electrostatic latent image is formed. This latent image is then developed into visible toner image by the developing cartridge, e.g., the cartridge 4a, as the photosensitive drum 1 further rotates in the direction of the arrow.

A description will now be given of a transfer process.

A transfer paper sheet is fed from a transfer sheet cassette 17 by a pickup roller 18, in synchronization with the image on the photosensitive drum 1, and is attracted by the surface of the transfer roller 10.

The transfer drum 10 is composed of a metallic cylinder 19 having a diameter of 156 mm, an elastic layer 2 mm thick wound on the metallic cylinder 19, and a PVDF layer 21 100 μm thick wound thereon, and is driven to rotate in the direction of the arrow substantially at the same peripheral speed as the photosensitive drum 1. In this embodiment, a foamed urethane produced by Inoac was used as the material of the elastic layer 20.

The transfer paper sheet fed onto the transfer drum 10 is gripped at its leading end by a gripper 22, so as to be secured on the transfer drum 10. A high voltage is applied between the photosensitive drum 1 and the transfer drum 10 by a high-voltage power supply (not shown), so that the toner image on the photosensitive drum 1 is transferred to the transfer paper sheet. At the same time, the transfer paper sheet is attracted by the transfer drum 10, as a result charging the transfer paper sheet. If necessary, a voltage is applied between the transfer drum 10 and a sheet charging roller 23 so that the sheet is attracted onto the surface of the transfer drum 10 before entering the developing zone.

The described image forming and transfer process is repeated to form and transfer color image components of cyan, yellow and black colors, whereby a color image composed of a plurality of color image components is formed on the transfer paper sheet. The transfer paper sheet now carrying the color image is then peeled off the transfer drum 10 by means of a separator charger 2 and a separator claw 24. The transfer paper sheet is then introduced into a fixing device 25 where the color toner image is fixed under application of heat and pressure, whereby a permanent color image is obtained.

Any residual toner remaining on the photosensitive drum 1 without being transferred to the transfer paper sheet is removed by a known cleaning device 26 of the type employing a fur brush 28 or a blade means.

It is preferred that a fur brush 28 or a drum cleaning device 27 is used to remove any toner from the transfer drum 10.

Details of the image recording process performed by this color image forming apparatus will be described with specific reference to FIG. 12. Numeral 29 in FIG. 12 denotes a light shield plate.

As stated before, a transfer paper sheet is fed from a sheet stack in the transfer paper cassette 17 by the operation of a pickup roller 18 so that the leading end of the sheet is caught and gripped by the gripper 22 so as to be secured to the transfer drum 10. As the transfer drum 10 rotates, the light shield plate 29 disposed in the vicinity of the gripper 22 is moved across the path of light to the interrupter 30, whereby a position signal 35 is produced. The controller 34 produces an image signal 37 by using the position signal 35 as a vertical synchronizing signal, so that a latent image is formed on the photosensitive drum 1. Numeral 31 designates a BD sensor. The laser beam is deflected by the rotating polygon mirror 32 so as to oscillate, and the deflected beam reaching a predetermined position is received and detected by the BD sensor 31. Upon detection of the deflected laser beam, the BD sensor 31 produces a BD signal 32 which will be described later. In the embodiment shown in FIG. 12, the circumferential distance between a point A and a point B is set to be substantially equal to the circumferential distance between the point B and a point C. Consequently, the toner image is transferred to the transfer paper sheet at the point B. The described process is conducted four times to form and transfer color image components of magenta, cyan, yellow and black colors, whereby a color image is formed.

Figure 1:
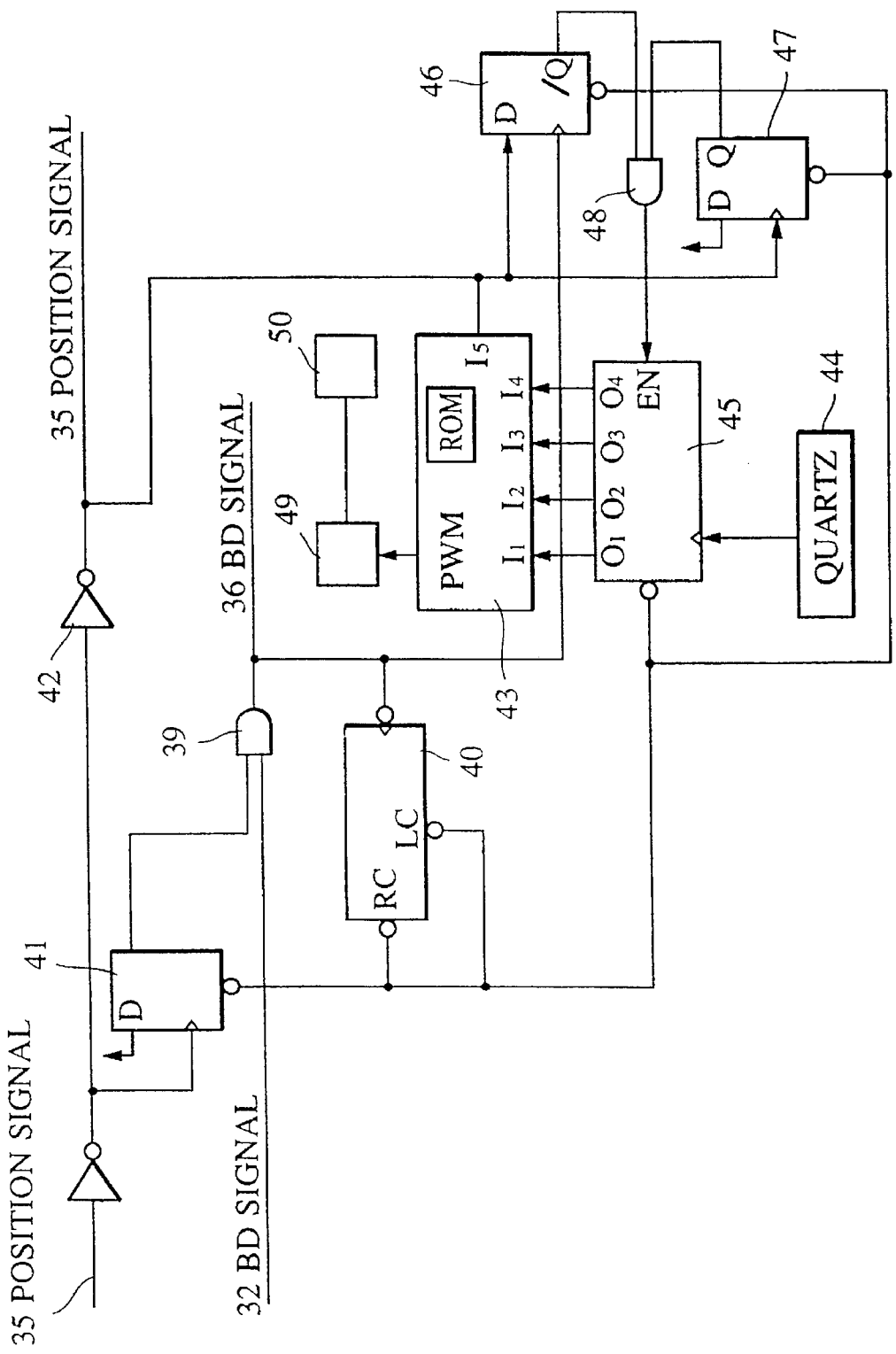
FIG. 1 is a block diagram showing the construction of a timing signal correction circuit incorporated in an embodiment of an image recording apparatus of the present invention.

FIG. 1 is a block diagram showing the construction of a circuit pertaining to the position signal 35 and the BD signal 32 and the construction of a circuit for controlling the rotation of the transfer drum.

Figure 3:
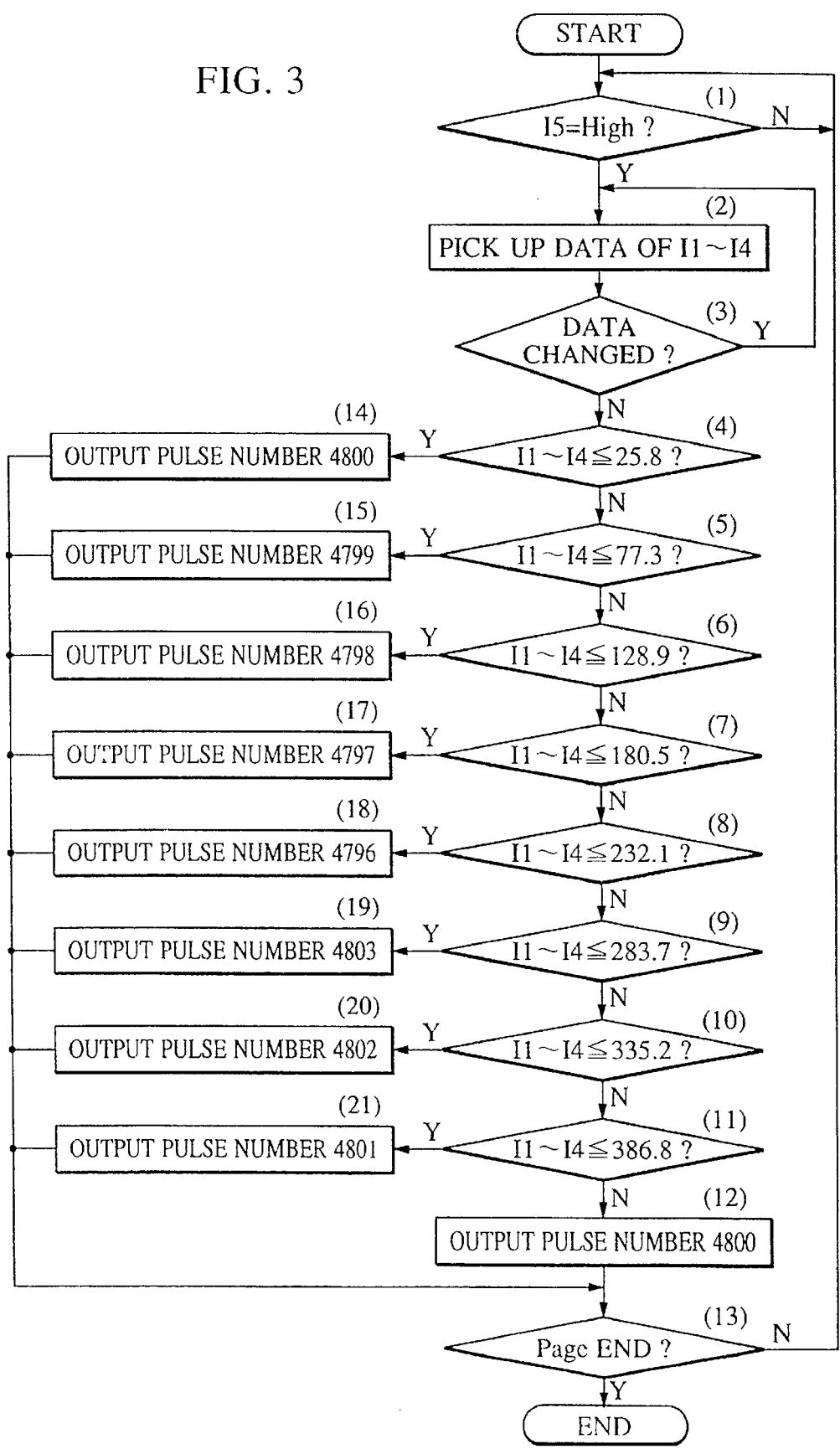
FIG. 3 is a flow chart showing a first main/sub-scan asynchronism correction process employed in a first embodiment of an image recording method of the present invention.

Referring to FIG. 1, numeral 43 designates a microcomputer incorporating a CPU, RAM and ROM and having input terminals I1 to I5. The microcomputer 43 produces at its output a pulse-width-modulated (PWM) pulse signal as will be described later. This output pulse signal is supplied to a pulse motor driving circuit board 49 the output of which is supplied to the pulse motor 50. In this embodiment, the pulse motor 50 may be a stepping motor and is used for driving the transfer drum 10. The input terminals I1 to I4 are connected to a counter 45, while the input terminal I5 receives the position signal 35. The microcomputer 43 conducts a signal processing operation in accordance with a control program which includes a flow as shown in FIG. 3. The control program is stored in the ROM incorporated in the microcomputer 43.

Numeral 46 denotes a D flip-flop having a D input which receives the position signal 35, and a clock input terminal which receives the BD signal 36. Another flip-flop 47 has a clock input terminal which receives the position signal 35 and is adapted to be set high when the level of the position signal 35 is changed to high. Consequently, a two-input AND gate 48 receives the Q signal of the D flip-flop 47 and the /Q signal of the D flip-flop 46. Throughout the specification, a sign "/" immediately preceding a symbol indicating a signal means inversion of such a signal.

The timings of the signals are illustrated in FIGS. 2(a)–(d).

The output from the two-input AND gate 48 is connected to an EN (enable) terminal of the counter 45. The counter 45 operates only when the level of the output received by the EN terminal is high. A clock terminal of the counter 45 receives a pulse signal from a quartz oscillator 44.

From the foregoing description, it will be understood that, according to the described arrangement, the output from the two-input AND gate 48 corresponds to the time difference ΔT mentioned before.

In the illustrated embodiment, the driving pulse signal for driving the pulse motor 50 is controlled in accordance with the above-mentioned time difference ΔT.

Although not exclusive, the light-shield width of the light shield plate 29 is determined to be 25.4 mm, and the line density is set to be 600 DPI (Dots Per Inch). The pulse motor 50 which effects sub-scan by driving the transfer drum 10 has such a resolution as to cause a 1-inch movement of the sub-scan per 4800 pulses input thereto.

Thus, 8 (eight) pulses are required for one pitch of sub-scan. In the illustrated embodiment, printing mis-registration in the sub-scan direction is conducted by using these eight pulses. The sub-scan speed is set to be 102.6 mm/sec.

Figure 2:
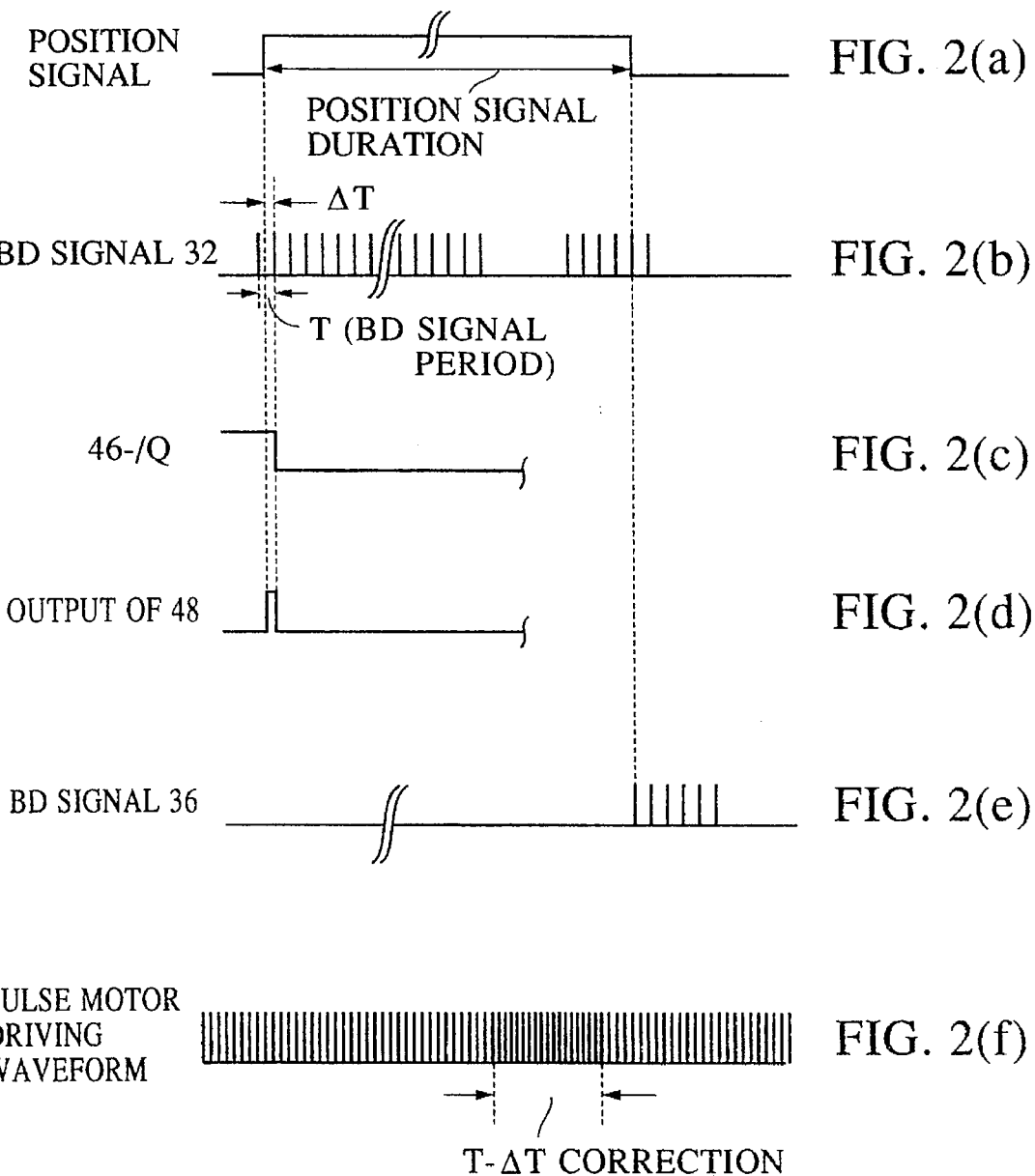
FIGS. 2(a)–(f) comprise a timing chart illustrative of the operation of the circuit shown in FIG. 1.

FIGS. 2(a)–(f) comprise a timing chart illustrative of the operation of the circuit shown in FIG. 1. FIGS. 2(a), (b) and (c) of show the aforesaid position signal 35, BD signal 32 and the /Q signal from the D flip-flop 46. FIG. 2(d) shows the output from the AND circuit 48. FIG. 2(e) shows the BD signal 36 after elimination of the sub-scan mis-registration. It will be seen that this BD signal 36 is synchronous with the fall of the position signal 35. FIG. 2(f) shows a train of pulse motor driving pulses. The number of pulses generated is adjusted in a correction period corresponding to the detected time difference ΔT.

FIG. 3 is a flow chart showing a first main/sub-scan asynchronism correcting process employed in the described embodiment. This process is to perform such a control as to cancel the time difference ΔT between the BD signal 32 and the position signal 35, which is used as the sub-scan synchronizing timing signal, by controlling the number of pulses for driving the pulse motor 50 under the control of the microcomputer 43. This process has Steps 1 to 21 as illustrated.

The process begins with monitoring of the level of the signal at the input terminal I5 of the microcomputer 43. Step 1 determines whether or not the level of the signal at the input terminal I5 is set high. If the answer is YES, the process proceeds to Step 2 to pick up data input I1 to I4 from the counter 45. Then, Step 3 determines whether or not the data is changed. The fact that the data is changing means that the counter 45 is performing the counting. This step is continued until the change in the data terminates. When the change of the data is terminated, Steps 4 to 11 are executed to pick up the data and to compare these data with values stored beforehand in the form of a table in the ROM of the microcomputer 43, and then Steps 12 and 14 to 21 are executed to generate a pulse number corresponding to the measured time difference ΔT. In Step 13, a determination is done as to whether the process has been done to the end of the page. If the answer is NO, the process returns to Step 1 to wait for the next high level of the input at I5. Conversely, if the answer is YES, the process is finished.

As will be understood from the foregoing description, the first embodiment executes two measuring steps: namely, a measuring step inclusive of Steps 4 to 11 for measuring the time difference between the moment at which the position signal is detected and the moment at which the first pulse signal is detected by the photo-sensor; and a pulse number increment/decrement step inclusive of Steps 12 and 14 to 21 in which the number of the driving pulses applied to the pulse motor is increased or decreased in a stepped manner in accordance with the measured time difference within the range which does not exceed the number of the driving pulses required for rotating the transfer drum by one pitch of the sub-scan.

More specifically, the above-mentioned time difference, i.e., the length of time elapsed from the detection of the position signal from the interrupter 30 by the photo-sensor (constituted by a photo-diode) till the detection of the first pulse signal, is measured. Then, a digital control is executed to stepwise increase or decrease the number of the driving pulses applied to the pulse motor 50 in accordance with the detected time difference, within the number of pulses which is required for effecting a shift of the drum surface by an amount corresponding to one pitch of the sub-scan. Consequently, the operation of the drum driving system and the operation of the image writing system are substantially synchronized with each other by a signal processing operation, before the recording is actually commenced.

In the first embodiment as described, the pulse motor 50 is adapted to drive the transfer drum 10. This, however, is only illustrative and the same advantage can be enjoyed when the arrangement is modified such that the pulse motor 50 drives the photosensitive drum 10, or when a different type of driving motor is used.

It is not essential that the transfer drum 10 is controlled in phase with the transient state of the position signal 35. Therefore, although the light shield width of the shield plate 29 is set to 25.4 mm, the light shield width may be varied as desired.

Namely, on condition that the existence of the position signal 35 is detected, the time difference is detected between the rise or fall of the position signal 35 and the fall or rise of the BD signal, and the transfer drum 10 is controlled in the manner described above at a suitable timing before the formation of the next color image component, i.e., laser exposure for the next color, is actually commenced.

This embodiment is preferably carried out such that, after completion of the image formation (laser exposure) for the preceding color image component, the control of the transfer drum 10 is performed in the described manner after the transfer of the image formed by the above-mentioned laser exposure to the transfer paper sheet held on the transfer drum. More specifically, referring to FIG. 12, the arrangement is preferably such that the circumferential length of the transfer drum 10 is greater than the length of the greatest size of the transfer paper sheet used in the apparatus, by an amount which corresponds to the circumferential distance between the laser exposure position and the transfer position, so that, when the light shield plate 29 is detected by the interrupter 30, the trailing end of the preceding page just passes the point B. The arrangement also may be such that the control of the transfer drum 10 and the laser exposure for the next color image component are executed when a predetermined number of BD signals 32 has been counted.

More preferably, the rotational driving of the support member 9 supporting the developing cartridges is commenced such that, before the transfer of a preceding color image component is completed, the developing cartridge for the next color image component is brought to the position where it confronts the photosensitive drum surface. According to such an arrangement, it is possible to eliminate color mis-registration through the control of the transfer drum 10, without prolonging the time between completion of formation of a preceding color image component and starting of formation of the next color image component.

[Second Embodiment]

Figure 6:
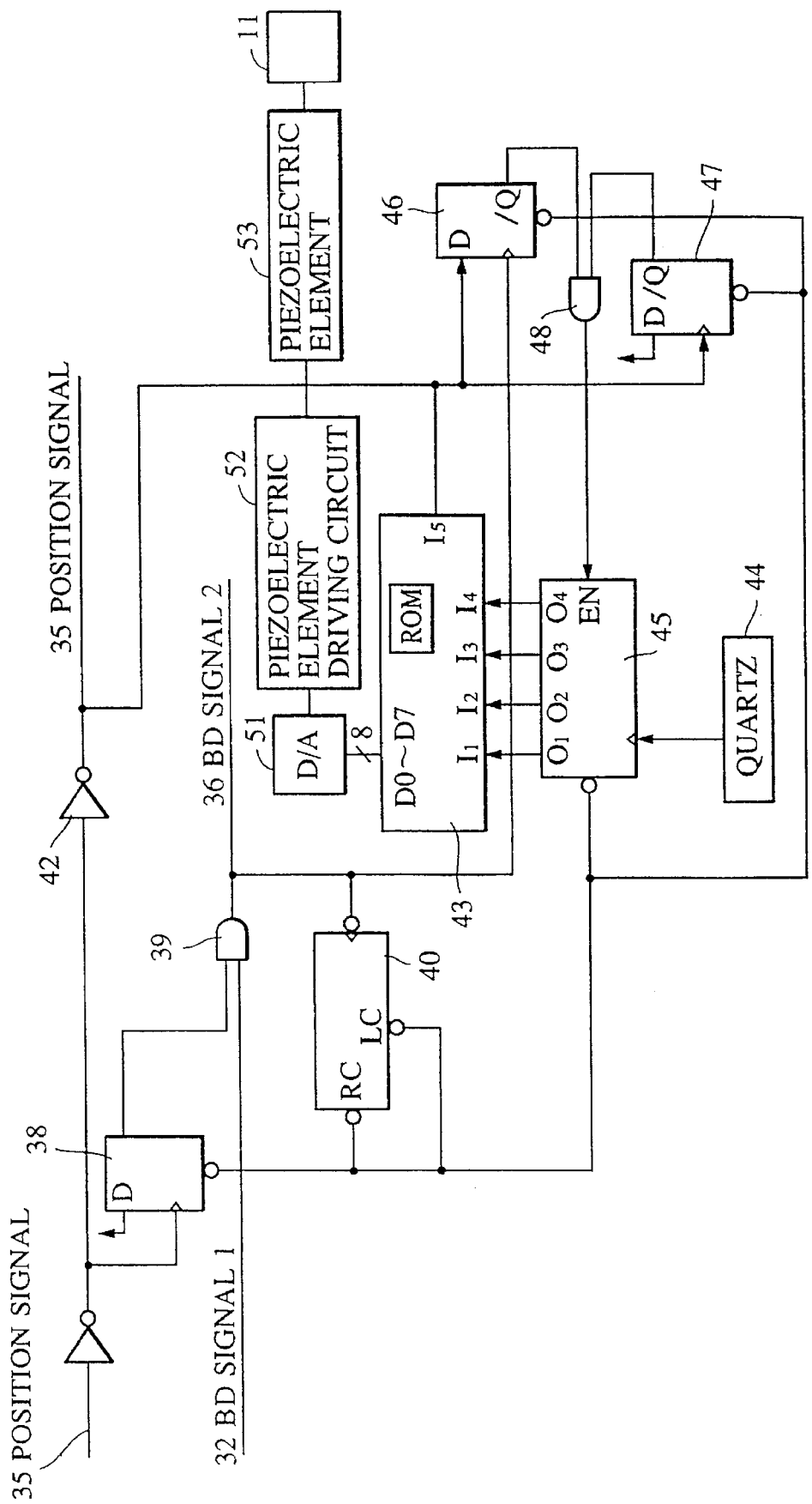
FIG. 6 is a block diagram showing the construction of a portion of a second embodiment of the image recording apparatus in accordance with the present invention.

FIG. 6 is a block diagram showing a portion of an image recording apparatus as a second embodiment of the present invention. In this Figure, the same reference numerals as those appearing in FIG. 1 are used to denote the parts or components which are the same as or equivalent to those used in the first embodiment. The features described before in connection with FIGS. 10 to 13 are also employed in the second embodiment, so that detailed description is omitted as to such features.

Figure 5:
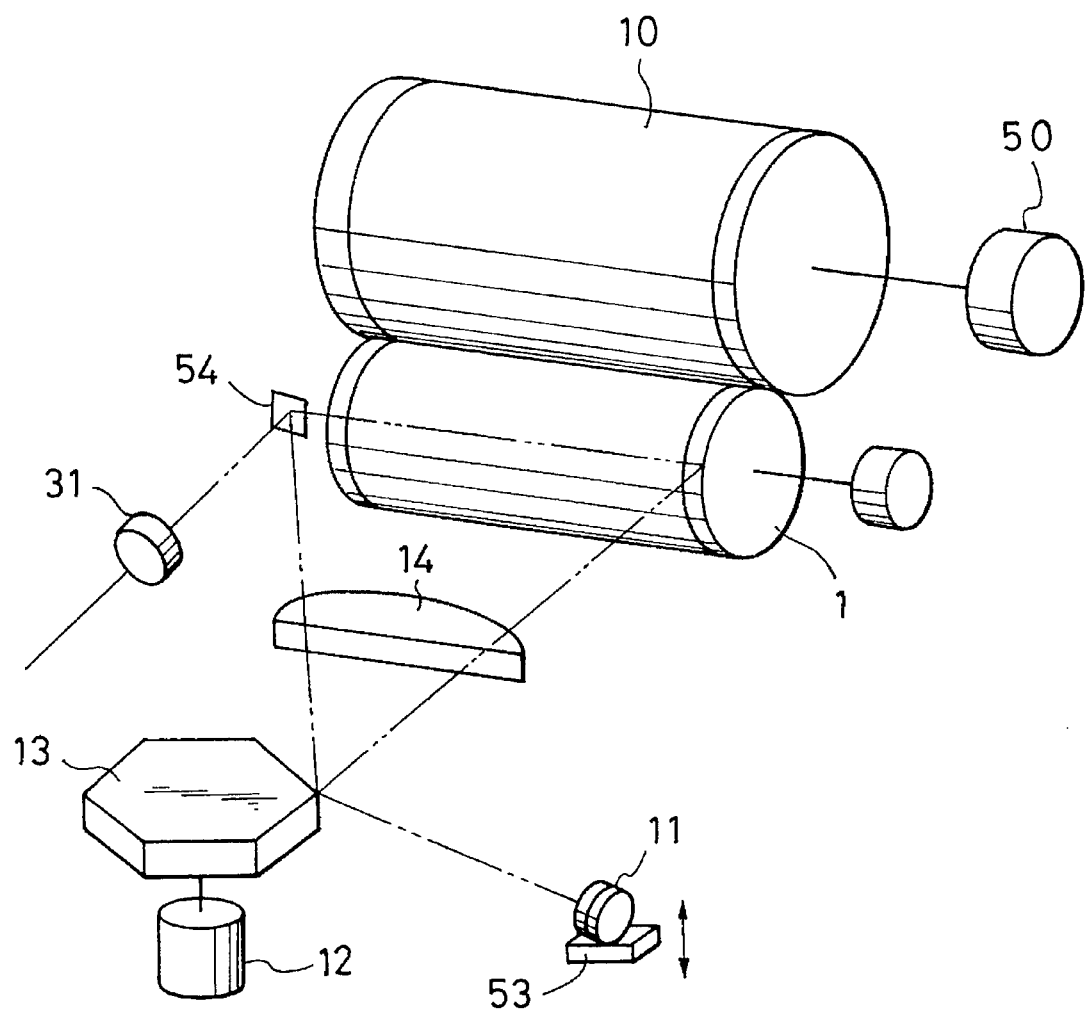
FIG. 5 is a schematic perspective view of a portion of a color image forming apparatus embodying the present invention.

In contrast to the first embodiment in which the microcomputer 43 produces a PWM output, the microcomputer 43 produces digital data D0 to D7 in the second embodiment. These data D0 to D7 are input to a D/A converter 51 so as to be converted into an analog voltage in accordance with the values of D0 to D7. The analog voltage thus obtained is input to a piezoelectric element driving circuit 52 which drives a piezoelectric element 53 in accordance with the level of the input analog voltage. The piezoelectric element 53 is connected to a laser diode 11 as shown in FIG. 5, so as to control the position of the laser diode 11.

Figure 7:
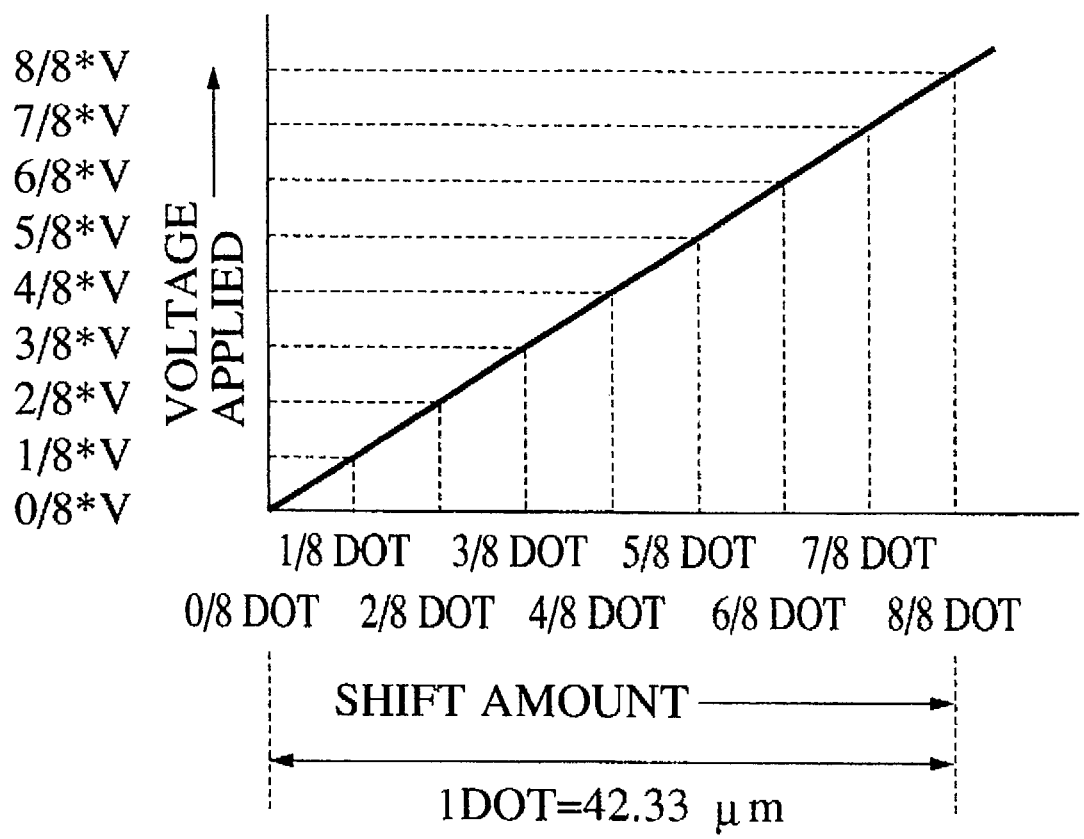
FIG. 7 is an illustration of the relationship between a shift amount and a voltage value which is determined based on a time difference detected by a counter incorporated in the apparatus shown in FIG. 6 and which is applied to a piezoelectric element.

The piezoelectric element used in this embodiment may be an element which is generally known as "barium titanate", and has characteristics as shown in FIG. 7. It will be seen that the piezoelectric element 53 substantially linearly increases the shift amount in accordance with an increase in the input voltage (voltage applied), thus serving as a shifting means for shifting the laser diode 11. The shifting means, however, may be constituted by an element or device other than the described piezoelectric element, such as, for example, a stepping motor.

Alternatively, the arrangement may be such that the shifting means constituted by the piezoelectric element 53 or a stepping motor is connected to the mirror 15 of the color image recording apparatus shown in FIG. 10 so as to effect a movement of the mirror 15 up and down as indicated by arrows, in accordance with the voltage input thereto. A description will now be given of a second main/sub-scan asynchronism correcting process performed in the second embodiment of the image recording apparatus, with reference to a flow chart shown in FIG. 8 and a timing chart shown in FIGS. 9(a)–(e). In contrast to the first embodiment in which the number of the driving pulses for driving the pulse motor is changed in accordance with the detected time difference ΔT, the second embodiment controls the voltages of the data D0 to D7 for driving the piezoelectric element 53, in accordance with the characteristics as shown in FIG. 7.

Figure 8:
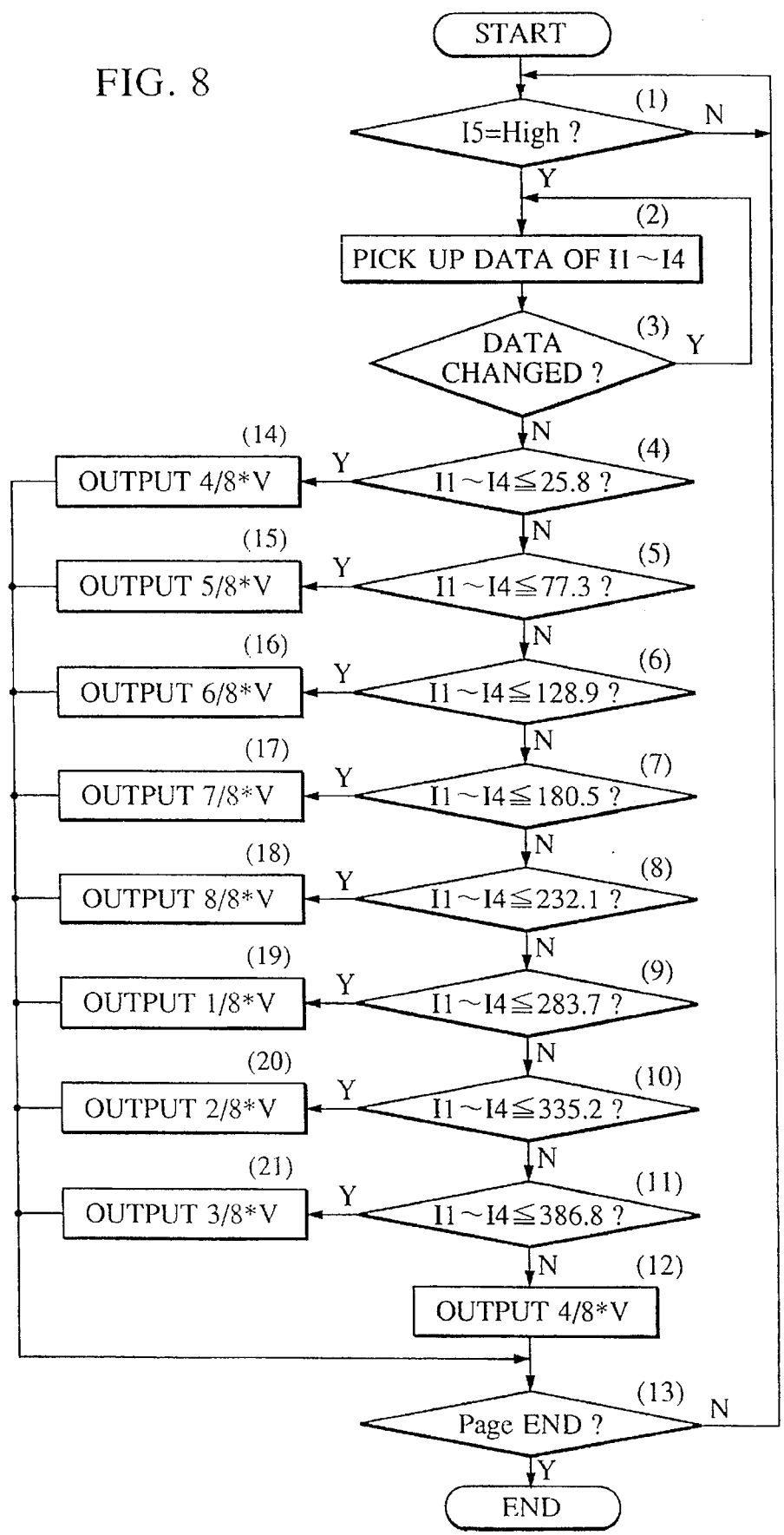
FIG. 8 is a flow chart showing a second main/sub-scan asynchronism correction process employed in a second embodiment of an image recording method of the present invention.
Figure 9A:
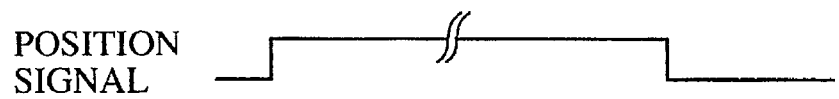
Figure 9C:
Figure 9D:
Figure 9E:
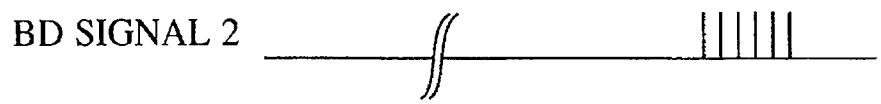

FIG. 8 is a flow chart showing the second main/sub-scan asynchronism correcting process employed in the second embodiment. This process is to perform such a control as to cancel the time difference ΔT between the BD signal 32 and the position signal 35 which is used as the sub-scan synchronizing timing signal, by controlling the driving of the piezoelectric element 53 under the control of the microcomputer 43 shown in FIG. 1. This process has Steps 1 to 21 as illustrated.

The process begins with monitoring of the level of the signal at the input terminal I5 of the microcomputer 43. Step 1 determines whether or not the level of the signal at the input terminal I5 is set high. If the answer is YES, the process proceeds to Step 2 to pick up data input I1 to I4 from the counter 45. Then, Step 3 determines whether or not the data is changed. The fact that the data is changing means that the counter 45 is performing the counting. This step is continued until the change in the data terminates. When the change of the data is terminated, Steps 4 to 11 are executed to pick up the data and to compare these data with values which follow the piezoelectric element characteristics shown in FIG. 7 and which have been stored beforehand in the form of a table in the ROM or RAM of the microcomputer 43, and then Steps 12 and 14 to 21 are executed in which a voltage corresponding to the result of the comparison is output from the piezoelectric element driving circuit 52 so as to supply the piezoelectric element 53 with data necessary for shifting the BD sensor 31 by an amount corresponding to the measured time difference ΔT, thereby canceling the time difference ΔT. In Step 13, a determination is done as to whether the process has been completed down to the end of the page. If the answer is NO, the process returns to Step 1 to wait for the next high level of the input at I5. Conversely, if the answer is YES, the process is finished.

As will be understood from the foregoing description, the second embodiment executes two measuring steps: namely, a measuring step inclusive of Steps 4 to 11 for measuring the time difference between the moment at which the position signal is detected and the moment at which the pulse signal (BD signal) is detected by the BD sensor 31; and a voltage increment/decrement step inclusive of Steps 12 and 14 to 21 in which the voltage applied to the shifting means (piezoelectric element 53) for shifting the laser diode 11 is increased or decreased in a stepped manner in accordance with the measured time difference.

More specifically, the above-mentioned time difference, i.e., the length of time elapsed from the detection of the position signal 35 till the detection of the BD signal by the BD sensor 31, is measured and, then, a control is executed to stepwise increase or decrease the voltage applied to the piezoelectric element 53 for shifting the photo-sensor in accordance with the detected time difference, so as to control the position of the laser diode 11 in the sub-scan direction at a resolution which corresponds to ⅛, i.e., from 0/8 to 8/8, of the pitch of the sub-scan, i.e. at a resolution corresponding to ⅛ dot which amounts to 42.33 μm, while the position signal 35 is in the transient period. Consequently, the operation of the drum driving system and the operation of the image writing system are substantially synchronized with each other by a mechanical position adjustment, before the recording is actually commenced.

The resolution of the mechanical position adjustment described above can suitably be determined depending on factors such as the recording density in the sub-scan direction. Thus, a finer positional adjustment can be effected as desired, as will be clear from the foregoing description.

Although the mechanical position adjustment by the shifting means has been described to be executed while the position signal 35 is in the transient period, this is not exclusive and the position adjustment may be doe at any suitable timing before the image forming process is actually started, as in the first embodiment described before, since the width of the light shield plate 29 is variable.

[Third Embodiment]

In the first and second embodiments as described, the width of the light shield plate 29 is fixed (e.g., 25.4 mm) and is stored as a known value. In the third embodiment, however, the width of the light shield plate is measured in the image recording sequence. Then the process of the flow of the first or second embodiment is executed by conducting, taking into account the measured value of the width of the light shield plate, the increment/decrement control of the driving pulses to be supplied to the pulse motor 50 or the increment/decrement control of the voltage applied to the piezoelectric element 53.

Practically, idle rotation of the transfer drum 10 is commonly conducted in an ordinary color image recording sequence, for various purposes such as jam detection or initial rotation. The length of time over which the light shield plate 29 interrupts the light to the interrupter 30 can be measured during such idle rotation of the transfer drum 10. It is therefore possible to calculate the width of the light shield plate, using a known value of the recording speed which is stored, for example, in the ROM. For instance, when the time length of the light interruption is 495.126 msec while the known recording speed is 102.6 mm/sec, the width of the light shield plate can easily be calculated to be 50.8 mm.

This width equals to 2 inches and, when the density of the main scan lines, i.e., the recording density in the sub-scan direction, is 600 DPI, corresponds to 1200 main scan lines.

The algorithm or process flow used in the first or second embodiment described above is executed based on this width value, so as to nullify the time difference ΔT, thereby preventing occurrence of mis-registration of color image components which are successively transferred to a transfer paper sheet held on the transfer drum 10.

In a modification of the third embodiment, the time difference between the rising edge of the position signal 35 and the BD signal 32 and the time difference between the falling edge of the position signal 35 and the BD signal 32 are measured for each amount of correction control of the transfer drum 10, during idling of the transfer drum 10, and the amount of variation for each amount of correction control is stored in the RAM. In operation, the rotation of the transfer drum 10 is controlled in accordance with a correction control amount which is selected out of the values stored in the RAM so as to absorb the variation in the time difference between the rising edge of the position signal 35 and the BD signal over different color image components. In this modification, it is possible to confirm in the image formation that an equal time difference between the fall of the position signal and the BD signal 32 has been obtained over all the color image components, and to update the content of data stored in the RAM based on this time difference value.

In the foregoing description of operations of the first and the third embodiments, when the arrangement is such that the control of the transfer drum 10 is executed while the position signal 35 is in the transient state, the control of the drum rotation is stated to be executed such that the fall of the position signal 35 and the BD signal 36 are synchronized with each other. This statement, however, is not intended to essentially require that the timing of fall of the position signal 35 and the BD signal 36 coincide with each other. Namely, the statement is intended to mean that the time differences between the falls of the position signals 35 and the BD signals 36 for all the color image components are substantially equal.

The described embodiment may be modified such that the content of the above-mentioned RAM can be sheltered in a non-volatile memory in the event of the power supply being turned off. In such a modification, optimum correction control amount can be selected without delay after recovery of the power supply.

In the foregoing description, a full color image is formed on a transfer paper sheet wound on a transfer drum 10, by successively transferring and superposing color image components of different colors from the photosensitive member onto the transfer paper sheet. It is to be noted, however, the invention can be applied to an apparatus which employs a different image forming process. For instance, the invention can be used equally well in an apparatus of the type having a transfer drum 10 made of a material capable of forming an image thereon, so that color image components are successively superposed and formed on the transfer drum so as to form a full-color toner image which is then transferred to a sheet in a single transfer step.

Although the invention has been described through its preferred forms, it is to be understood that the described embodiments are only illustrative and various changes and modifications may be imparted thereto without departing from the scope of the invention which is limited solely by the appended claims.

What is claimed is:

1. An image recording apparatus usable with a rotationally-driven image carrier and a photosensitive drum, said image record apparatus comprising:

position signal output means for outputting a position signal when the image carrier is at a predetermined rotational position and, in response to the output position signal, starting each of a plurality of color component image formations using each of a plurality of color components, respectively, scanning means for scanning the photosensitive drum with a light beam modulated in accordance with an image signal;

beam detection signal generating means for generating a beam detection signal upon detection of the light beam at a predetermined position, so as to regulate a timing of the light beam modulation for each line of scan;

image transferring/superposing means for sequentially transferring and superposing on the image carrier a plurality of color component images formed on the photosensitive drum;

measuring means for measuring a time difference between the position signal and the beam detection signal for each of the plurality of color component images;

control means for controlling at least the rotation of the image carrier based on the time difference measured by said measuring means;

wherein the position signal comprises a pulse signal having a predetermined duration, said measuring means measures the time difference between a front edge of the position signal and the beam detection signal, said control means performs the control based on said time difference within a time period corresponding to said pulse signal, and a detection member of a predetermined width is attached to the image carrier and said position signal output means detects the detection member and outputs as the position signal a pulse of a duration corresponding to the width of the detection member.

2. An image recording apparatus according to claim 1, further comprising means for measuring the duration of the position signal before image formation.

3. An image recording apparatus usable with a rotationally-driven image carrier and a photosensitive drum, said image recording apparatus comprising:

position signal output means for outputting a position signal when the image carrier is at a predetermined rotational position and, in response to the output position signal, starting each of a plurality of color component image formations using each of a plurality of color components, respectively;

scanning means for scanning the photosensitive drum with a light beam modulated in accordance with an image signal;

beam detection signal generating means for generating a beam detection signal upon detection of the light beam at a predetermined position, so as to regulate a timing of the light beam modulation for each line of scan;

image transferring/superposing means for sequentially transferring and superposing on the image carrier a plurality of color component images formed on the photosensitive drum;

measuring means for measuring a time difference between the position signal and the beam detection signal for each of the plurality of color component images;

control means for controlling at least the rotation of the image carrier based on the time difference measured by said measuring means;

developing means provided for each of the plurality of color components; and moving means for bringing said developing means for the color component to be formed to a developing position, wherein said moving means commences, before the transfer of a color component image to the image carrier, the movement of said developing means for a subsequent color component image towards the developing position.

4. An image recording apparatus usable with a rotationally-driven image carrier and a photosensitive drum, said image recording apparatus comprising:

position signal output means for outputting a position signal when the image carrier is at a predetermined rotational position and, in response to the output position signal, starting each of a plurality of color component image formations using each of a plurality of color components, respectively;

scanning means for scanning the photosensitive drum with a light beam modulated in accordance with an image signal;

beam detection signal generating means for generating a beam detection signal upon detection of the light beam at a predetermined position, so as to regulate a timing of the light beam modulation for each line of scan;

image transferring/superposing means for sequentially transferring and superposing on the image carrier a plurality of color component images formed on the photosensitive drum;

measuring means for measuring a time difference between the position signal and the beam detection signal for each of the plurality of color component images; and control means for controlling, based on the time difference measured by said measuring means, a position of the light beam in a direction that crosses a scanning direction of said scanning means, wherein said control means comprises one of means for controlling a position of a light beam generating means and means for controlling a position of a mirror for reflecting the light beam.

5. An image recording apparatus according to claim 4, wherein said control means further comprises one of a piezoelectric element and a stepping motor for shifting the position of one of the light beam generating means and the mirror.

6. An image recording apparatus for forming a color image by superposing frame images of a plurality of colors, comprising:

forming means for making a light beam in accordance with an image signal reflected by a rotating rotational polyhedric mirror, scanning on a predetermined photosensitive member with said light beam, and forming a frame image on said photosensitive member;

superposing means for transferring a plurality of frame images formed by said forming means on a moving predetermined image bearing member and superposing said plurality of frame images;

first generating means for generating a first synchronizing signal indicating a state of rotation for said rotational polyhedric mirror;

second generating means for generating a second synchronizing signal indicating that said image bearing member has moved to a predetermined position; and rotation velocity control means for varying a moving velocity of said image bearing member in accordance with a phase difference between said first and second synchronizing signals.

7. An image recording apparatus according to claim 6, wherein said image bearing member is driven by a stepping motor.

8. An image recording apparatus according to claim 6, wherein said first synchronizing signal is generated by detecting a light beam reflected by a rotational polyhedric mirror.

9. An image recording apparatus according to claim 6, wherein said second synchronizing signals are generated by the number of frame images superposed on said image bearing member.

10. An image recording apparatus according to claim 6, wherein varying rotation velocity by said rotation velocity control means is performed before transferring each of said frame images on said image bearing member.

11. An image recording method for forming a color image by superposing frame images of a plurality of colors, comprising the steps of:

forming step for making a light beam in accordance with an image signal reflected by a rotating rotational polyhedric mirror, scanning on a predetermined photosensitive member with said light beam, and forming a frame image on said photosensitive member;

superposing step for transferring a plurality of frame images formed in said forming step on a moving predetermined image bearing member and superposing said plurality of frame images;

first generating step for generating a first synchronizing signal indicating a state of rotation of said rotational polyhedric mirror;

second generating step for generating a second synchronizing signal indicating that said image bearing member has moved to a predetermined position; and rotation velocity control step for varying a moving velocity of said image bearing member in accordance with a phase difference between said first and second synchronizing signals.

12. An image recording apparatus for forming a color image by superposing frame images of a plurality of colors, comprising:

forming means for making a light beam in accordance with an image signal reflected by a rotational polyhedric mirror, scanning on a predetermined photosensitive member, and forming a frame image on said photosensitive member;

superposing means for transferring a plurality of frame images formed by said forming means on a predetermined image bearing member to move by the velocity based on a first control clock and superposing said plurality of frame images;

first generating means for generating a first synchronizing signal indicating a timing of rotation of said rotational polyhedric mirror;

second generating means for generating a second synchronizing signal indicating that said image bearing member has moved to a predetermined position;

third generating means for generating pulses of the number indicating a phase difference between said first and second synchronizing signals; and switching means for switching a first control clock for deciding a velocity of said image bearing member in accordance with the number of said pulses to a second control clock.

13. An image recording method for forming a color image by superposing frame images of a plurality of colors, comprising the steps of:

forming step for making a light beam in accordance with an image signal reflected by a rotational polyhedric mirror, scanning on a predetermined photosensitive member, and forming a frame image on said photosensitive member;

superposing step for transferring a plurality of frame images formed on said forming step on a predetermined image bearing member to move by the velocity based on a first control clock and superposing said plurality of frame images;

first generating step for generating a first synchronizing signal indicating a timing of rotation of said rotational polyhedric mirror;

second generating step for generating a second synchronizing signal indicating that said image bearing member has moved to a predetermined position;

third generating step for generating pulses of the number indicating a phase difference between said first and second synchronizing signals; and switching step for switching a first control clock for deciding velocity of said image bearing member in accordance with the number of said pulses to a second control clock.

14. An image recording apparatus for superposing a plurality of images having a plurality of lines and forming a color image on a moving image bearing member, comprising:

first generating means for generating a first synchronizing signal indicating a timing of writing each of said plurality of lines;

second generating means for generating a second synchronizing signal indicating that said image bearing member has moved to a predetermined position; and rotation velocity control means for varying moving velocity of said image bearing member in accordance with a phase difference between said first and second synchronizing signals.

15. An image recording apparatus according to claim 14, wherein said image bearing member is moved by using a stepping motor.

16. An image recording apparatus according to claim 14, wherein said image bearing member is a transferring member.

17. An image recording method for superposing a plurality of images having a plurality of lines and forming a color image on a moving image bearing member, comprising the steps of:

> first generating step for generating a first synchronizing signal indicating a timing of writing each of said plurality of lines;
>
> second generating step for generating a second synchronizing signal indicating that said image bearing member has moved to a predetermined position; and
>
> rotation velocity control step for varying moving velocity of said image bearing member in accordance with a phase difference between said first and second synchronizing signals.

18. An image recording apparatus comprising:

> exposure means for exposing in the main scanning direction of an image bearing member;
>
> driving means for driving said image bearing member in a sub scanning direction;
>
> first detection means for detecting a predetermined position of said image bearing member;
>
> second detection means for detecting an exposure position of said exposure means;
>
> generation means for generating a driving clock signal to control driving said image bearing member; and
>
> control means for controlling the driving clock signal generated by said generation means in accordance with an amount of mis-registration between the predetermined position detected by said first detection means and the exposure position detected by said second detection means,
>
> wherein said driving means drives said image bearing member on the basis of the driving clock signal controlled by said control means.

19. An image recording apparatus comprising:

> exposure means for exposing in a main scanning direction of an image bearing member;
>
> driving means for driving said image bearing member in a sub scanning direction;
>
> first detection means for detecting a predetermined position of said image bearing member;
>
> second detection means for detecting an exposure position of said exposure means;
>
> clock generation means capable of generating a first clock signal and a second clock signal to control driving said image bearing member; and
>
> control means for driving said image bearing member by selectively using the first clock signal and the second clock signal in accordance with an amount of mis-registration between the predetermined position detected by said first detection means and the exposure position detected by said second detection means.

20. An image recording apparatus comprising:

> exposure means for exposing in a main scanning direction of an image bearing member;
>
> driving means for driving said image bearing member in a sub scanning direction;
>
> first detection means for detecting a predetermined position of said image bearing member;
>
> second detection means for detecting an exposure position of said exposure means;
>
> clock generation means capable of generating a first clock signal and a second clock signal to control driving said image bearing member; and
>
> control means for driving said image bearing member by selectively using the first clock signal and the second clock signal in accordance with an amount of mis-registration between the predetermined position detected said first detection means and the exposure position detected by said second detection means,
>
> wherein selection of a clock by said control means is performed during a predetermined compensation period before forming an image.

* * * * *

UNITED STATES PATENT AND TRADEMARK OFFICE
CERTIFICATE OF CORRECTION

PATENT NO. : 5,634,171
DATED : May 27, 1997
INVENTOR(S) : Hakaru MUTO

Figure 12:
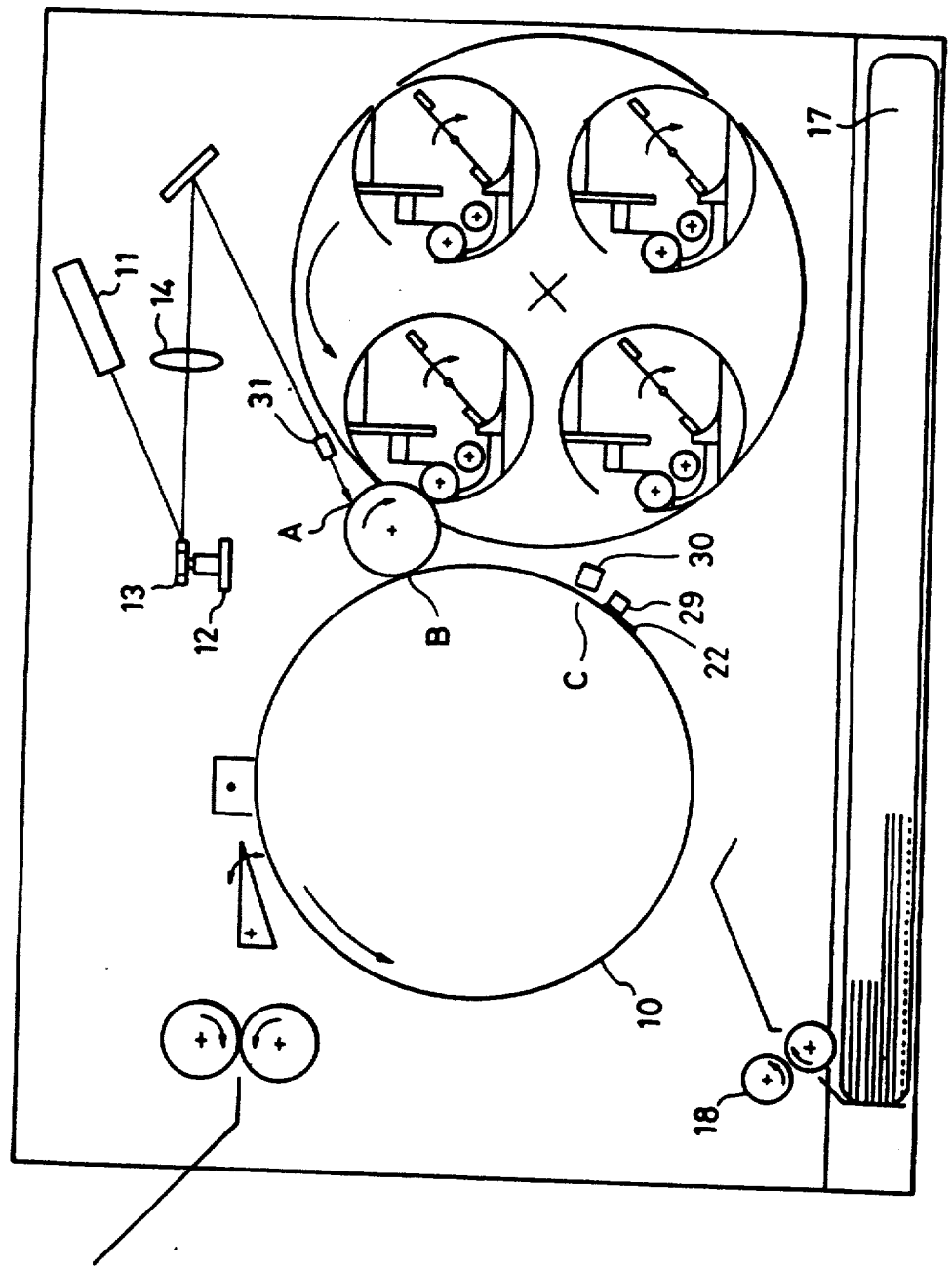
FIG. 12 is a schematic sectional view of a color image recording apparatus embodying the present invention, explanatory of image forming process performed by the apparatus.

It is certified that error appears in the above-identified patent and that said Letters Patent is hereby corrected as shown below:

FIGURE 10, sheet 11, replace Figure 10, sheet 11, with Figure 12, attached.

COLUMN 2, line 56, delete "falling" and insert therefor --failing--;

COLUMN 3, line 27, delete "mans" and insert therefor --means--.

COLUMN 6, line 29, delete "A—Si" and insert thereofr --A-Si--.

COLUMN 8, line 18, delete "indicating" and insert therefor --indicates--.
Line 46, delete "of".

COLUMN 12, line 6, delete "doe" and insert therefor --done--

COLUMN 18, line 39, after "detected", insert --by--.

Signed and Sealed this

Second Day of December,1997

Attest:

BRUCE LEHMAN

*Attesting Officer*     Commissioner of Patents and Trademarks